(12) United States Patent
Vigouroux et al.

(10) Patent No.: US 8,045,755 B2
(45) Date of Patent: Oct. 25, 2011

(54) METHOD FOR SELECTING IMAGE PIXELS TO WATERMARK AND WATERMARKING METHOD USING THIS SELECTION

(75) Inventors: Jean-Ronan Vigouroux, Rennes (FR); Pascal Bourdon, Le Grand Fougeray (FR); Didier Doyen, La Bouexiere (FR)

(73) Assignee: Thomson Licensing, Issy-les-Moulineaux (FR)

( * ) Notice: Subject to any disclaimer, the term of this patent is extended or adjusted under 35 U.S.C. 154(b) by 805 days.

(21) Appl. No.: 12/157,468

(22) Filed: Jun. 11, 2008

(65) Prior Publication Data
US 2009/0003650 A1    Jan. 1, 2009

(30) Foreign Application Priority Data
Jun. 29, 2007    (FR) ...................................... 07 56188

(51) Int. Cl.
*G06K 9/00*    (2006.01)
*G09G 5/02*    (2006.01)
(52) U.S. Cl. .................. 382/100; 382/166; 345/589
(58) Field of Classification Search .................. 382/100, 382/103, 107, 162, 163, 164, 165, 166, 167, 382/168, 174, 181, 219, 232, 254, 274, 276, 382/305, 312; 345/589; 380/218; 700/94
See application file for complete search history.

(56) References Cited

U.S. PATENT DOCUMENTS

| | | | | |
|---|---|---|---|---|
| 7,043,019 B2 * | 5/2006 | Tehranchi et al. | ............ | 380/218 |
| 7,430,302 B2 * | 9/2008 | Thorwirth | ..................... | 382/100 |
| 7,693,330 B2 * | 4/2010 | So | ................................ | 382/174 |
| 7,853,040 B2 * | 12/2010 | Thorwirth | ..................... | 382/100 |
| 7,974,714 B2 * | 7/2011 | Hoffberg | ......................... | 700/94 |
| 2006/0152524 A1 * | 7/2006 | Miller et al. | ................. | 345/589 |

FOREIGN PATENT DOCUMENTS

| | | |
|---|---|---|
| EP | 1414250 A2 | 10/2003 |
| WO | WO 2004/040899 A2 | 5/2004 |

OTHER PUBLICATIONS

Search Report Dated Jan. 25, 2008.

\* cited by examiner

*Primary Examiner* — Seyed Azarian
(74) *Attorney, Agent, or Firm* — Myers Wolin, LLC

(57) ABSTRACT

This invention relates to a method to select, in an input image, pixels that can be watermarked by replacing their colour by a metameric colour. It comprises the following steps:

- correct the input image by applying a predetermined gamma law,
- convert the input image into a 'metameric' image in which the colours of the input image pixels are replaced by metameric colours,
- simulate the capture of the input image and of the metameric image by a camcorder in order to generate respectively a captured input image and a captured metameric image,
- determine, in a colour space and for each pixel of the input image, the distance between the colour of said pixel in the captured input image and in the captured metameric image, and
- select the pixels of the input image for which the distance is greater than a threshold.

The invention also concerns a watermarking method based on metamerism.

7 Claims, 3 Drawing Sheets

METHOD FOR SELECTING IMAGE PIXELS TO WATERMARK AND WATERMARKING METHOD USING THIS SELECTION

This application claims the benefit, under 35 U.S.C. §119, of European Patent Application No. 0756188 of 29 Jun. 2007.

SCOPE OF THE INVENTION

This invention relates to a method to select, in a video image, pixels which can be watermarked by replacing their colour by a metameric colour. The invention also concerns a watermarking method based on metamerism.

TECHNOLOGICAL BACKGROUND OF THE INVENTION

Patent application WO 2004/040899 discloses techniques to modify, in an imperceptible manner for the human eye, the spectrum of the images displayed by a video projector in order to deter the copy of images using a camcorder. The modification of the spectrum is obtained by using a fourth primary colour component. This fourth primary is used to create spectra having different spectral compositions but inducing the same light and colorimetric perception by the human eye. Such spectra exist for each colour since the human eye only uses three types of receivers (or cones) to create the colorimetric sensation associated with a light. Spectra producing identical effects on the three types of receivers appear identical to the eye without necessarily being identical. Such spectra are called metameric. We also speak of metameric colours or metameric mixtures. Camcorders generally having RGB light receivers noticeably different from those of the human eye, metameric spectra for the human eye are not necessarily metameric for the camcorder and appear as different with respect to chrominance or luminance on the copy filmed by the camcorder. This effect is then used to insert watermarking or anti-copy marks in the projected images to degrade the quality of the copies made by the camcorder and possibly know the origin of the copy. The watermarking is for example a message indicating that the film is an illicit copy or a code identifying the film which has been copied or the cinema that has projected the film. This patent application also gives a method to calculate the proportions of each of the primary components to make it possible to obtain different mixtures having the same colorimetric coordinates in a visual colour space as a given light that can be obtained by three primaries.

Patent application US 2006/0152524 discloses also metameric techniques that are adapted to deter the copy of images using a camcorder. According to paragraph 35 of this document, pixels or groups of pixels (i.e. image portions) that can be watermarked are randomly selected or selected among the image portions having high spatial detail, without consideration about the efficiency of the metameric jamming itself for a camcorder.

Problems inherent in the use of metameric spectra nonetheless exist. All the spectators do not necessarily have the same colour perception. Hence, a watermarking which should normally be invisible for all the spectators can be visible for some of them. Moreover, if the fourth primary is produced by an additional projector, there may be a geometrical alignment problem for the four primaries. Therefore, the impact of these problems should be reduced so that the watermarking insertion does not disturb the spectators present in the cinema. Moreover, it is advisable to enhance the efficiency of the metameric jamming itself for a camcorder.

SUMMARY OF THE INVENTION

According to the invention, it is proposed to insert the watermarking only in the image areas where the watermarking degrades enough the quality of images copied illegitimately by a camcorder and to exclude the areas where the degradation would not be annoying.

The invention concerns a method to select, in an input image, pixels that can be watermarked by replacing their colour in the input image by a metameric colour. The method comprises the following steps:
  if necessary to represent the colours of the input image in a linear colour space, correct the input image by applying a predetermined gamma law,
  convert the input image into a 'metameric' image in which the colours of the input image pixels are replaced by metameric colours,
  simulate the capture of the input image and of the metameric image by a camcorder in order to generate respectively a captured input image and a captured metameric image,
  determine, in a 'measurement' colour space and for each pixel of the input image, the distance between the colour of said pixel in the captured input image and the colour of the corresponding pixel in the captured metameric image, and
  select the pixels of the input image for which said distance is greater than a threshold value.

The invention concerns also a method to select pixels that can be watermarked in an input image comprising the following steps:
  generate a 'metameric' image by replacing the colours of the input image pixels by colours that are metameric for the human eye,
  using simulation 'reference' sensor(s), simulate the capture of the input image and the capture of the metameric image by a camcorder having said simulation 'reference' sensor(s), in order to generate respectively a captured input image and a captured metameric image,
  determine, in a 'measurement' colour space and for each pixel of the input image, the distance between the colour of the corresponding pixel in the captured input image and the colour of the corresponding pixel in the captured metameric image, and
  select the pixels of the input image for which said distance is greater than a threshold value.

To simulate the capture of the input image and of the metameric image with a camcorder, the method comprises preferably, for each of the pixels of the input image and of the metameric image, the following steps:
  calculate the frequency spectrum emitted by said pixel,
  determine the colour delivered by the image sensor of the camcorder when it receives said frequency spectrum, and
  optionally, correct the value of said pixel by applying a predetermined reverse gamma law.

According to a particular embodiment, the measurement colour space is the Lab space and the threshold value is set to 2.5.

The invention also concerns a method to watermark an input image by replacing the colour of the image pixels by a metameric colour, in which the watermarked pixels are the pixels selected according to the aforementioned selection method.

BRIEF DESCRIPTION OF THE DRAWINGS

The invention will be better understood upon reading the following description, provided as a non-restrictive example and referring to the annexed drawings wherein.

DETAILED DESCRIPTION OF AT LEAST ONE EMBODIMENT

Figure 1:
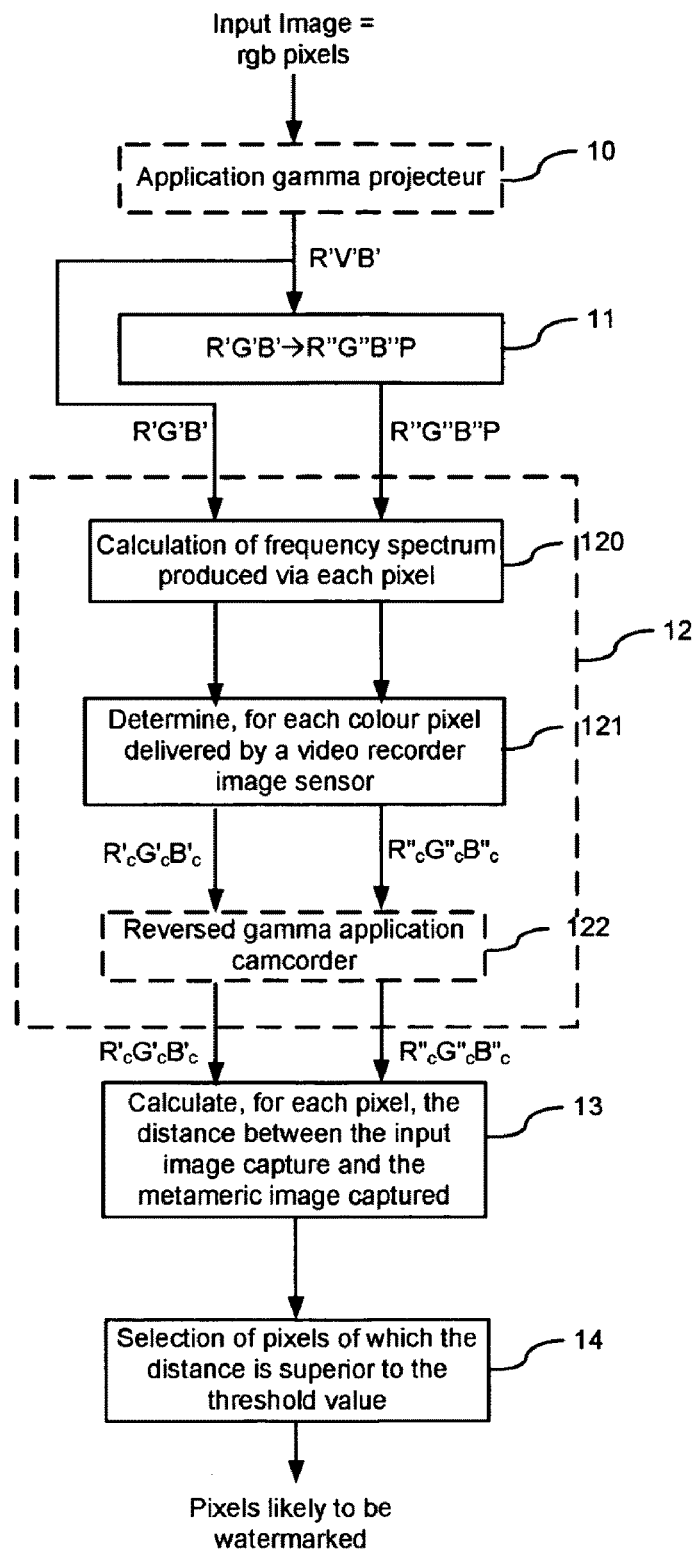
FIG. 1 is a flowchart showing the steps of the selection method in accordance with the invention.

FIG. 1 represents the steps of a selection method in accordance with the invention. The selection is made on an input image the pixel colour of which is defined by 3 R, G and B components expressed in the RGB space.

According to a first step 10, a correction according to a gamma law is generally applied to the video signal of the input image. The gamma law is generally associated with a display device and characterizes its electro-optical response. The gamma law is for example of the form:

$$n_s = N_s \cdot \left(\frac{n_e}{N_e}\right)^\gamma$$

where
- $n_e$ is the level of a component at the display device inlet,
- $n_s$ is the light intensity emitted by the display device when it receives at the input level $n_e$,
- $N_e$ is the maximum level at display device input,
- $N_s$ is the maximum light intensity at display device output, and
- $\gamma$ is a coefficient characterizing this gamma law.

This function is non-linear and its result is to attenuate the low video levels. To compensate for the electro-optical response of a display device, it is known to pre-correct the video signal with a reverse gamma law and this pre-correction is traditionally carried out in the camera producing the input image. The reverse gamma law applied to the video signal is described in particular in the DCI (Digital Cinema initiative) standard. The value of the gamma coefficient is generally equal to 2.6. When the video signal is so pre-corrected to compensate for the electro-optical response of a display device, the video signal of the input image is non-linear. Step 10 is intended to transpose, if necessary, the signal rgb of the input image in a linear representation space, as the device-dependent 'RGB' color space. The correction gamma law applied to the signal at step 10 is therefore the reverse of the pre-correction law that is possibly applied by the camera. This optional step 10 is intended to represent the colours of the input image in a linear RGB color space. The law used at step 10 is the law commonly applied to the video signal by a video projector such as a DLP projector, before image display. This is why this gamma law is called hereafter 'projector gamma law'. The video signal, after application of this projector gamma law, is noted as R'G'B'.

If the colours of the input image are already expressed in a linear representation space, this step 10 can be avoided.

According to a step 11, the R'G'B' video signal is converted into a R"G"B"P video signal based on 4 primary components, namely a red component R", a green component G", a blue component B" and an additional component P called fourth primary. The processing applied to the R'G'B' signal is for example that described in paragraphs [0017], [0018] and [0019] in patent application WO 2004/040899. This processing 11 is such that the values of the R", G", B" and P components for a given pixel of the image produce a spectrum which is metameric for the human eye to that of the R'G'B' signal. Colours of the input image pixels are replaced by colours that are metameric for the human eye. According to patent WO 2004/040899, the processing consists in searching for R", G", B", P mixtures which produce the XYZ colorimetry determined by the R'G'B' input pixels. This means solving a linear system with three equations (an equation for X, an equation for Y and an equation for Z) and four unknowns (R", G", B" and P). This system admits an endless number of solutions, among which a solution corresponding to R"=R', G"=G', B"=B' and P=0 (the spectra of the metameric image and of the input image are then identical) and solutions with P non-null (the fourth primary is lit up) exist.

If several permissible R"G"B"P mixtures (that is to say having positive R", G", B" and P components and less than the maximum, typically 1.0) are possible, the mixture the P component of which is the highest is preferably chosen to obtain a maximum visible effect in the case of watermarking with this mixture. An image called metameric in which the video information of each pixel is coded on four primary components is thus generated and obtained.

According to a step 12, the capture of this metameric image and the capture of the input image by a camcorder having simulation 'reference' sensors is simulated. This simulation is carried out, pixel by pixel, in several sub-steps. In a first sub-step 120, the frequency spectrum emitted by the pixel considered is calculated. For the metameric image, this spectrum is calculated using, as a basis, the frequency spectrum generated by each of the four primary colours associated with the four components of the metameric image and the intensity of these four components. This spectrum is therefore equal to the sum of the spectra of the four primary colours, each spectra being weighted by the intensity of the corresponding component. Likewise, for the input image, this spectrum is calculated using as a basis the frequency spectrum generated by each of the three primary colours associated with the three components of the input image and the intensity of these three components. As above, this spectrum is equal to the sum of the spectra of the three primary colours, each spectra being weighted by the intensity of the corresponding component. In a second sub-step 121, the response of the simulation 'reference' sensors to these frequency spectra is calculated based on the spectral sensitivities of the sensors. The camcorder here being equipped with three types of sensors (a simulation sensor to detect the red component $R_c$ of the filmed scene or spectrum, another simulation sensor to detect the green component $V_c$ and another simulation sensor to detect the blue component $R_b$), a $R'_c G'_c B'_c$ signal is generated for the input image and a $R''_c G''_c B''_c$ signal is generated for the metameric image, both signals being expressed in a linear colour space. For this step, simulation 'reference' sensors are used. These simulation reference sensors correspond for example to the sensors most commonly used in the camcorders or they correspond to sensors having a response which is the average response of the sensors existing on the market for each colour. The images that are obtained at the end of this sub-step 121 are called 'captured input image' and 'captured metameric image'.

In order that the simulation of the image capture by a camcorder having these simulation 'reference' sensors is complete, a transfer function corresponding to the reverse gamma law traditionally applied by the camcorders may be applied to the $R'_cG'_cB'_c$ et $R''_cG''_cB''_c$ signals during a substep 122, in order to get $r'_cg'_cb'_c$ et $r''_cg''_cb''_c$ signals.

The simulation step proposed above is only an embodiment. There are other possibilities. It is possible, for example, to calculate from the values of the input image pixels and from the values of the metameric image pixels the values of the pixels of the images captured by the camera without using the calculation of the spectrum but only using constant matrices calculated from the spectrum of the lights and of the spectral sensitivities of the camera sensors.

According to a step 13, the $R'_cG'_cB'_c$ and $R''_cG''_cB''_c$ signals are compared. This comparison consists in calculating, in a predetermined colour space that may be different from the above linear colour space, and for each of the image pixels, the distance separating this pixel in the captured input image ($R'_cG'_cB'_c$) from the same pixel in the captured metameric image ($R''_cG''_cB''_c$). This distance is for example calculated in the non-linear visual perceptually uniform 'Lab' colour space developed by the ICI (International Commission on Illumination). To calculate this distance in this Lab colour space, the $R'_cG'_cB'_c$ and $R''_cG''_cB''_c$ signals are converted from the RGB linear colour space to the Lab space. The Lab space being defined with respect to the XYZ space, a first step consists in changing from the RGB space to the XYZ space with the conversion matrix:

$$\begin{pmatrix} X \\ Y \\ Z \end{pmatrix} = \begin{bmatrix} 0.618 & 0.177 & 0.205 \\ 0.299 & 0.587 & 0.114 \\ 0 & 0.056 & 0.944 \end{bmatrix} \cdot \begin{pmatrix} R \\ V \\ B \end{pmatrix}$$

The second step consists in changing from the XYZ space to the Lab space with the following formulae:

$$L = 116 \cdot \left(\frac{Y}{Y_n}\right)^{\frac{1}{3}} - 16 \quad \text{for } \frac{Y}{Y_n} > 0.008856$$

$$L = 903.3 \cdot \left(\frac{Y}{Y_n}\right) \quad \text{for } \frac{Y}{Y_n} \leq 0.008856$$

$$a = 500 \cdot \left(f\left(\frac{X}{X_n}\right) - f\left(\frac{Y}{Y_n}\right)\right)$$

$$b = 200 \cdot \left(f\left(\frac{Y}{Y_n}\right) - f\left(\frac{Z}{Z_n}\right)\right)$$

with for t>0.008856 $f(t) = \sqrt[3]{t}$
and for t≤0.008856

$$f(t) = 7.7787 + \frac{16}{116}$$

This conversion in the Lab space is carried out for the two $R'_cG'_cB'_c$ and $R''_cG''_cB''_c$ signals. After conversion, these two signals are noted as respectively $L'_ca'_cb'_c$ and $L''_ca''_cb''_c$. The step 13 plans then to calculate, for each pixel of the input image, the distance separating the pixel of the input image ($L'_ca'_cb'_c$) from the same pixel in the captured image ($L''_ca''_cb''_c$) by calculating for example $\sqrt{(L'_c-L''_c)^2+(a'_c-a''_c)^2-(b'_c-b''_c)^2}$.

According to a step 14, then the pixels for which the distance calculated at step 13 is greater than a threshold value are selected. In the case where this value is calculated in the Lab space, this threshold value is for example equal to 2.5, value from which a difference of visual perception by the human eye is notable. Other colour spaces can be used to calculate this distance, the chosen threshold value varying then according to this colour space. The pixels thus selected represent the pixels for which the colour difference between the captured input image and the metameric image captured by a camcorder is visible, or even very visible according to the chosen threshold value. Hence, during the image watermarking operation, the pixels to watermark will be chosen among these selected pixels to make sure that the watermarking is entirely visible.

Provision can be made to vary this threshold value. One can, for example, diminish this threshold value to increase the number of selected pixels and thus enlarge the size of the image area that can be watermarked. One can also make provision for an additional step aiming at excluding from the selected pixels the pixels the colour of which in the metameric image is likely to be incorrectly perceived by persons having a peculiar visual perception, such as for example colour-blind persons.

The pixels selected by this selection method are then used to define a mask identifying the image areas where to insert a watermarking by metamerism. This mask is used for image display by the projector or projectors. According to a first embodiment, the pixels located outside of the mask are displayed with 3 primaries (RGB) and the pixels contained in the mask are displayed with 4 primaries (RGBP). It should be noted that for the pixels contained in the mask but which are not to be watermarked (for example, when the "illegal copy" message is watermarked in an area of selected pixels of the image, the pixels which do not correspond to a message letter), the metameric mixture with four primaries which is applied is the mixture with the fourth primary P null. According to a more sophisticated embodiment, the fourth primary can be used gradually on the mask sides to avoid visible contour effects in the case of a slight geometrical offset between the fourth primary and the three other ones. A "composite" image comprising areas where the image is coded on three primaries and watermarked areas where the image is coded on four primaries is thus produced after using the mask. This composite image is either stored if the invention method is not applied in real time, or immediately projected according to the circumstances.

Figure 2A:
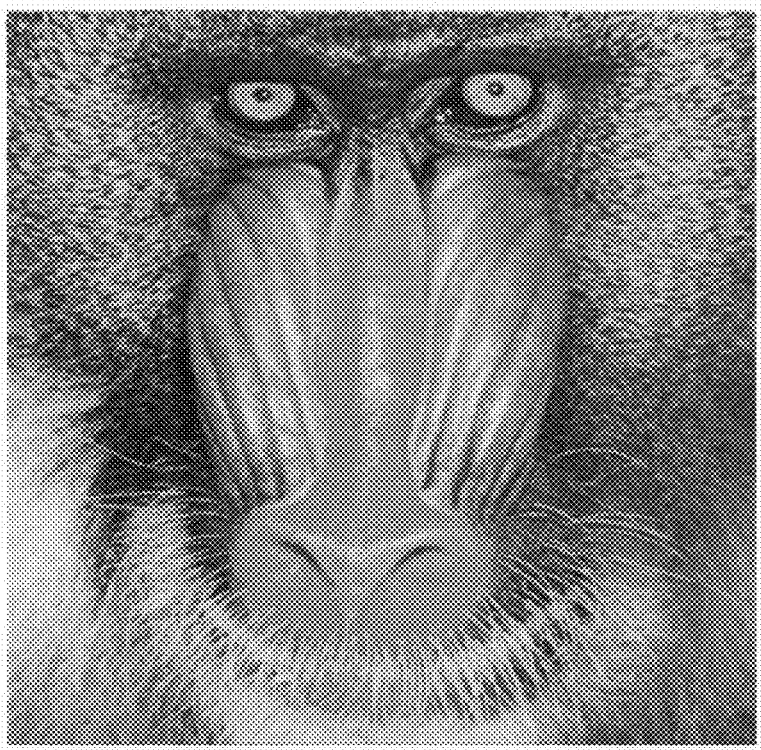
FIGS. 2A and 2D are images illustrating the result of some steps of FIG. 1.
Figure 2B:
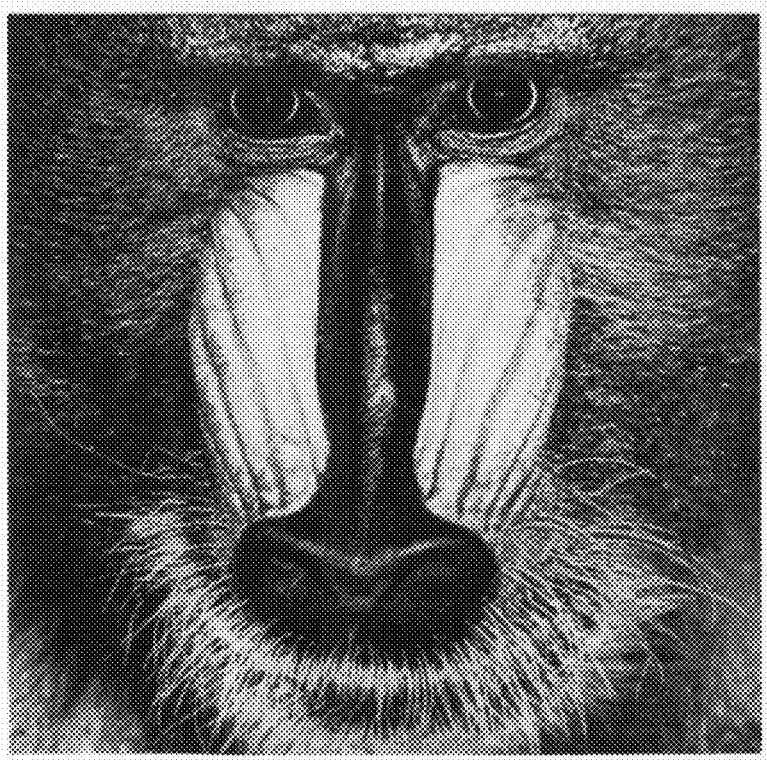
Figure 2C:
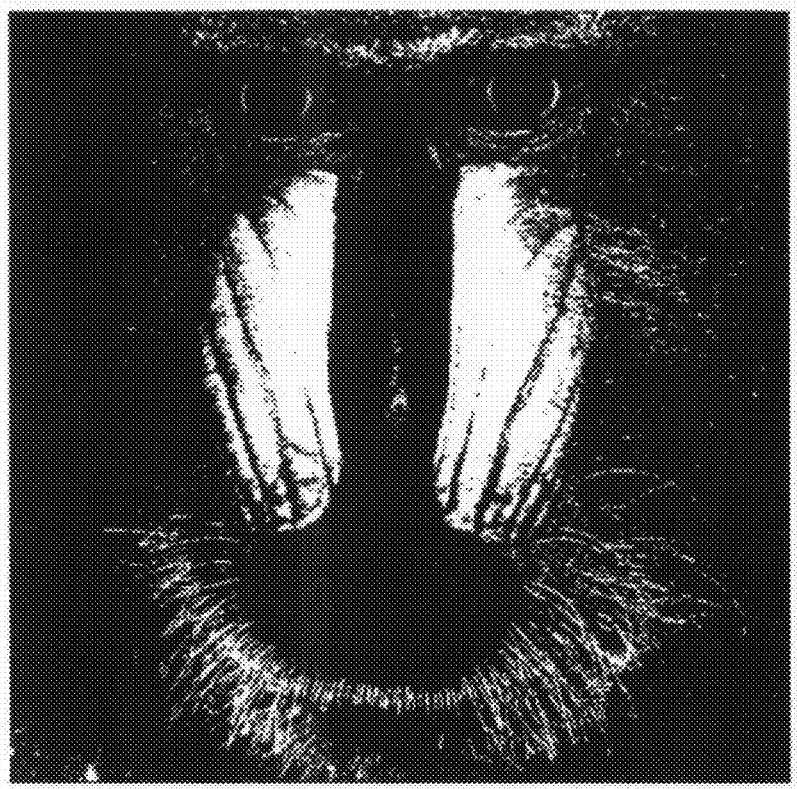
Figure 2D:
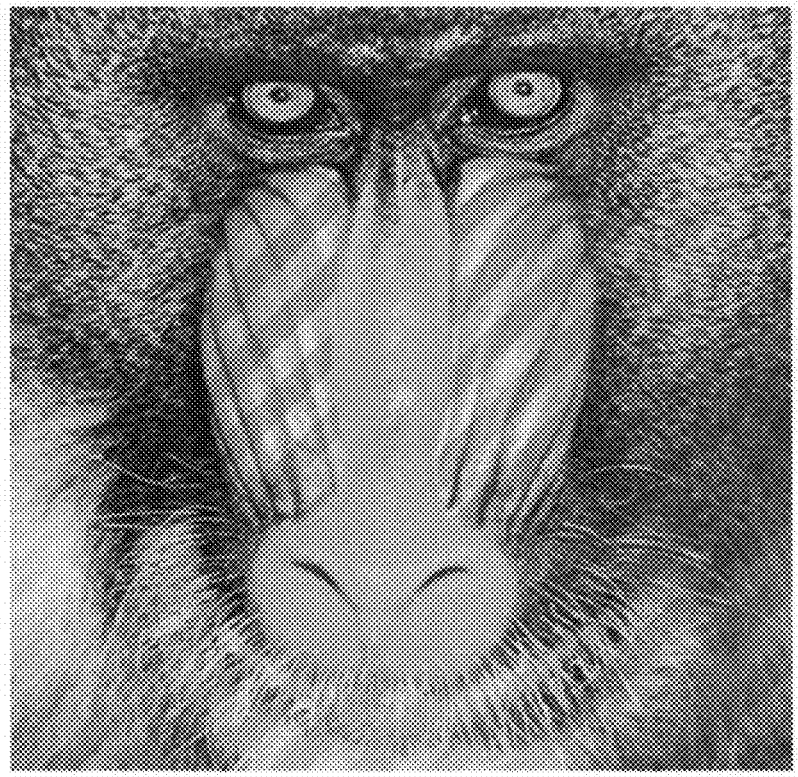

The invention selection method is illustrated by FIGS. 2A to 2D. FIG. 2A shows an image to watermark representing the head of a monkey. FIG. 2B represents the same image after application of steps 10 to 13. The light intensity of the pixels is proportional to the distance calculated at step 13. The light areas of the image correspond to the areas of the image where the distance is the greatest, and therefore to the areas where the watermarking is the most visible. FIG. 2C represents the same image after thresholding step 14. The white areas represent the pixels of the mask, that is to say the areas of the image to watermark. FIG. 2D represents the image of FIG. 2A after watermarking in the white areas identified in FIG. 2C.

Advantageously, the isolated pixels are removed from the mask since the display defects linked to possible geometrical alignment problems for the projectors used to display the watermarked image are generally more visible in them.

The implementation of this selection method is carried out in a video server or a post-production unit used to prepare the projection.

Naturally, the invention is not limited to the embodiment previously described. In particular, those skilled in the art can carry out watermarking by using more than four primaries, for example 5 primaries. In this case, steps 11 to 13 are adapted to process signals with 5 primaries. The selection method can be applied only to a part of the input image, this part being pre-selected beforehand by other selection algorithms.

The invention claimed is:

1. Method to select pixels that can be watermarked in an input image comprising the following steps:
    if necessary to represent the colours of the input image in a linear colour space, correct the input image by applying a predetermined gamma law,
    generate a 'metameric' image by replacing the colours of the input image pixels by colours that are metameric for the human eye,
    using simulation 'reference' sensor(s), simulate the capture of the input image and the capture of the metameric image by a camcorder having said simulation 'reference' sensors(s), in order to generate respectively a captured input image and a captured metameric image,
    determine, in a 'measurement' colour space and for each pixel of the input image, the distance between the colour of the corresponding pixel in the captured input image and the colour of the corresponding pixel in the captured metameric image, and
    select the pixels of the input image for which said distance is greater than a threshold value.

2. Method according to claim 1, in which, to simulate the capture of the input image and the capture of the metameric image by a camcorder, the method comprises, for each of the pixels of the input image and of the metameric image, the following steps:
    calculate the frequency spectrum emitted by said pixel,
    determine the colour signal delivered by said simulation image sensor(s) of the camcorder when receiving said frequency spectrum.

3. Method according to claim 1, in which the colour of the pixels of the input image is based on three primary colours (R. G. B) and the colour of the pixels of the metameric image is based on at least four primary colours (R, G, B, P).

4. Method according to claim 1, in which the measurement colour space is the L*a*b space.

5. Method according to claim 4, in which the threshold value is equal to 2.5.

6. Method according to claim 1, further comprising a step to delete isolated pixels among the selected pixels.

7. Method to watermark an input image by replacing the colour of the image pixels of said input image by a metameric colour, in which the watermarked pixels are selected pixels according to claim 1.

* * * * *